US012456983B2

United States Patent
Rosser

(10) Patent No.: US 12,456,983 B2
(45) Date of Patent: Oct. 28, 2025

(54) PHYSICS PACKAGES INCLUDING ATOMIC OR MOLECULAR VAPORS AND SUB-WAVELENGTH GRATING WAVEGUIDES AND/OR RADIO FREQUENCY WAVEGUIDES

(71) Applicant: The Aerospace Corporation, El Segundo, CA (US)

(72) Inventor: David Rosser, Rancho Palos Verdes, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 133 days.

(21) Appl. No.: 18/459,304

(22) Filed: Aug. 31, 2023

(65) Prior Publication Data

US 2025/0080125 A1   Mar. 6, 2025

(51) Int. Cl.
    *H03L 7/26*   (2006.01)
(52) U.S. Cl.
    CPC ..................... *H03L 7/26* (2013.01)
(58) Field of Classification Search
    CPC ....................................................... H03L 7/26
    USPC ............................................................ 331/94
    See application file for complete search history.

(56) References Cited

U.S. PATENT DOCUMENTS

| 2017/0146738 | A1* | 5/2017 | Xu | G02B 6/107 |
| 2021/0367403 | A1* | 11/2021 | Cheriton | H01S 5/142 |
| 2022/0390496 | A1 | 12/2022 | Aksyuk et al. | |

OTHER PUBLICATIONS

Bock et al., "Subwavelength grating periodic structures in silicon-on-insulator: a new type of microphotonic waveguide," Optics Express 18(19): 20251-20262 (2010).
Cheben et al., "Subwavelength integrated photonics," Nature 560(7720): 565-572 (2018).
Daschner et al., "Triple stack glass-to-glass anodic bonding for optogalvanic spectroscopy cells with electrical feedthroughs," Applied Physics Letters 105(4): 041107, 4 pages (2014).
Hänsel et al., "Opportunities for photonic integrated circuits in optical gas sensors," Journal of Physics: Photonics 2(1): 012002, 18 pages (2020).
Hogan et al., "Driving Rydberg-Rydberg transitions from a coplanar microwave waveguide," Physical Review Letters 108(6): 063004, 5 pages (2012).

(Continued)

*Primary Examiner* — Richard Tan
(74) *Attorney, Agent, or Firm* — LeonardPatel PC

(57) ABSTRACT

Physics packages including atomic or molecular vapors and sub-wavelength grating (SWG) waveguides and/or radio frequency (RF) waveguides are provided herein. In some examples, a physics package for interacting with atoms or molecules in a vapor includes a substrate, and a cell sealed to the substrate and storing the vapor. A SWG waveguide may be disposed on the substrate and within the cell. The SWG waveguide may include a plurality of grating segments that are spaced apart from one another and define a gap within the SWG waveguide. The vapor may be located at least within the gap. A first optical coupler couples light into the SWG waveguide such that the light propagates through the vapor located within the gap and interacts with the atoms or molecules in the vapor located within the gap. A second optical coupler receives light from the SWG waveguide.

20 Claims, 11 Drawing Sheets

(56) References Cited

OTHER PUBLICATIONS

Kitching J., "Chip-scale atomic devices," Applied Physics Reviews 5(3): 031302, 39 pages (2018).
Meyer et al., "Waveguide-coupled Rydberg spectrum analyzer from 0 to 20 GHz," Physical Review Applied 15(1): 014047, 10 pages (2021).
Mu et al., "Edge couplers in silicon photonic integrated circuits," Applied Sciences 10: 1538, 29 pages (2020).
Santamaria-Botello et al., "Comparison of noise temperature of Rydberg-atom and electronic microwave receivers," arXiv preprint arXiv:2209.00908v2, 24 pages (2022).
Stern et al., "Nanoscale light-matter interactions in atomic cladding waveguides," Nature Communications 4: 1548, 7 pages (2013).
Taurel et al., "Sub-wavelength grating interdigitated combs as photonic waveguides," Optics Letters 44(15): 3869-3872 (2019).
Urbonas et al., "Low-loss optical waveguides made with a high-loss material," Light: Science & Applications 10: 15, 7 pages (2021).
Zektzer et al., "Atom-Photon Interactions in Atomic Cladded Waveguides: Bridging Atomic and Telecom Technologies," ACS Photonics 8(3): 879-886 (2021).

\* cited by examiner

PHYSICS PACKAGES INCLUDING ATOMIC OR MOLECULAR VAPORS AND SUB-WAVELENGTH GRATING WAVEGUIDES AND/OR RADIO FREQUENCY WAVEGUIDES

STATEMENT OF GOVERNMENT INTEREST

This invention was made with government support under Contract No. [FA8802-19-C-0001] awarded by the Department of the Air Force. The government has certain rights in the invention.

FIELD

This application relates to devices using atomic or molecular vapors.

BACKGROUND

Atomic vapor cells are used in physics packages in applications for optical frequency references, atomic magnetic field sensors, atomic electric field sensors, atomic clocks, atomic inertial sensors, and other quantum technologies. However, atomic vapor cells are difficult to consistently produce at commercial scale, may use free space optics which occupy a large footprint, and are difficult to integrate with other electrical or optical systems.

SUMMARY

Physics packages including atomic or molecular vapors and sub-wavelength grating (SWG) waveguides and/or radio frequency (RF) waveguides are provided herein.

Some examples herein provide a physics package for interacting with atoms or molecules in a vapor. The physics package may include a substrate; a cell sealed to the substrate and storing the vapor; and a sub-wavelength grating (SWG) waveguide having a length and a width and disposed on the substrate. The SWG waveguide may include a plurality of grating segments that are spaced apart from one another and define a gap within the SWG waveguide. The vapor may be located at least within the gap. The physics package further may include a first optical coupler configured to couple light into the SWG waveguide such that the light propagates through the vapor located within the gap and interacts with the atoms or molecules in the vapor located within the gap. The physics package further may include a second optical coupler configured to receive light from the SWG waveguide.

In some examples, the gap within which the vapor is located, and through which the light propagates, includes a plurality of gaps which are located between the segments. In some examples, the segments are interdigitated.

In some examples, the segments include a first plurality of segments and a second plurality of segments that is spaced apart from the first plurality of segments by the gap within which the vapor is located, and through which the light propagates. In some examples, the segments of the first plurality of segments are separated from one another by a first plurality of additional gaps. In some examples, the segments of the second plurality of segments are separated from one another by a second plurality of additional gaps.

In some examples, the cell includes a cover, and a spacer layer disposed on the substrate. The spacer layer may couple the cover to the substrate and may seal the vapor at least within the gap.

In some examples, the physics package further includes a radio frequency (RF) waveguide. The RF waveguide may include a first RF electrode disposed on the substrate, and a second RF electrode disposed on the substrate. The SWG waveguide may be disposed between the first RF electrode and the second RF electrode. In some examples, the physics package further includes a first RF coupler configured to couple an RF signal into the first RF electrode and the second RF electrode; and a second RF coupler configured to receive the RF signal from the first RF electrode and the second RF electrode. In some examples, the RF signal perturbs the interaction between the light and the atoms or molecules in the vapor within the gap.

In some examples, the atoms or molecules in the vapor have at least first and second Rydberg energy levels.

In some examples, the atoms include an alkali metal, or the molecules include acetylene or HCN.

Some examples herein provide a method of making a physics package for interacting with atoms or molecules in a vapor. The method may include disposing a sub-wavelength grating (SWG) waveguide having a length and a width on a substrate. The SWG waveguide may include a plurality of grating segments that are spaced apart from one another and define a gap within the SWG waveguide. The method may include coupling a first optical coupler to the SWG waveguide such that light input to the first optical coupler propagates through the gap. The method may include coupling a second optical coupler to the SWG waveguide to receive light from the SWG waveguide. The method may include sealing the vapor at least within the gap.

In some examples, the gap within which the vapor is located, and through which the light propagates, includes a plurality of gaps which are located between the segments. In some examples, the segments are interdigitated.

In some examples, the segments include a first plurality of segments and a second plurality of segments that is spaced apart from the first plurality of segments by the gap within which the vapor is located, and through which the light propagates. In some examples, the segments of the first plurality of segments are separated from one another by a first plurality of additional gaps. In some examples, the segments of the second plurality of segments are separated from one another by a second plurality of additional gaps.

In some examples, sealing the vapor at least within the gap includes disposing a spacer layer on the substrate; and coupling a cover to the spacer layer.

In some examples, the method further includes disposing a radio frequency (RF) waveguide on the substrate, including: disposing a first RF electrode on the substrate; and disposing a second RF electrode on the substrate. The SWG waveguide may be disposed between the first RF electrode and the second RF electrode. In some examples, the method further may include: coupling a first RF coupler to the first RF electrode and the second RF electrode such that an RF signal applied to the first RF coupler propagates through the first RF electrode and the second RF electrode; and coupling a second RF coupler to the first RF electrode and the second RF electrode so as to receive the RF signal that propagates through the first RF electrode and the second RF electrode.

In some examples, the atoms or molecules in the vapor have at least first and second Rydberg energy levels.

In some examples, the atoms include an alkali metal, or the molecules include acetylene or HCN.

Some examples herein provide a method of using the present physics package. The method may include coupling light into the SWG waveguide using the first optical coupler;

coupling light from the SWG waveguide into a detector using the second optical coupler; and analyzing the interaction between the atoms or molecules in the vapor within the gap and light propagating through the waveguide, using an electrical signal from the detector.

DETAILED DESCRIPTION

Atomic and molecular vapor cells are useful in a variety of applications, and potentially can be used in applications which have not even been envisioned yet. Connectorized, broadband physics packages are provided herein that can be used in a plug-and-play manner into a wide variety of optical and/or electronic systems in which it would be desirable to interact light and/or a radio frequency (RF) signal with atoms or molecules. As described herein, components of the present physics packages may be manufactured at scale using a standard silicon photonics foundry, and an atomic or molecular vapor then may be sealed into the package using a back-end process with a high degree of reproducibility. In some examples, the present physics packages include sub-wavelength grating (SWG) waveguides that place the atoms or molecules of the vapor within the field of a propagating optical mode. Additionally, or alternatively, in some examples, the present physics packages include RF waveguides via which an RF signal can be used to perturb the atoms or molecules. As will now be described, such arrangement(s) may provide for a significantly stronger interaction between the atoms or molecules and the light and/or RF signal than available with previously known arrangements.

Figure 1A:
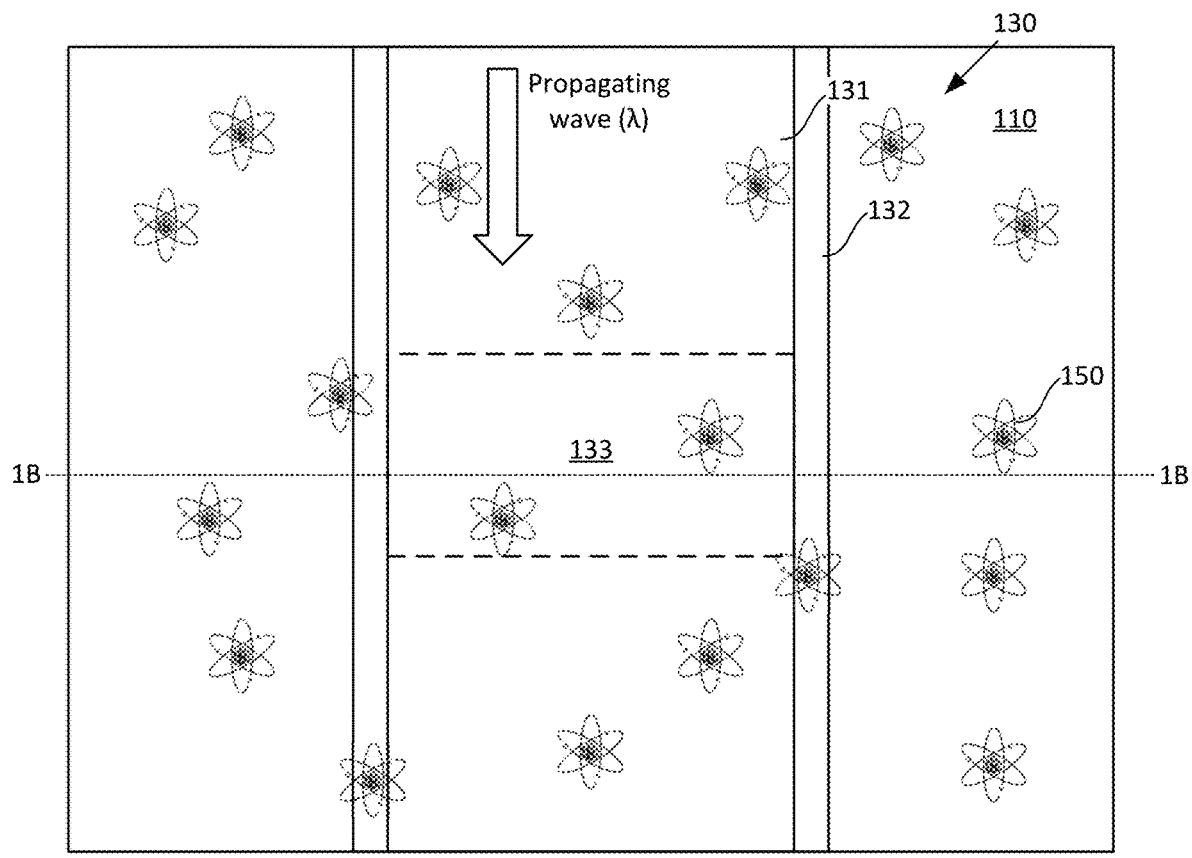
FIGS. 1A-1B schematically illustrate a previously known interaction between an atomic or molecular vapor and a ridge waveguide.
Figure 1B:
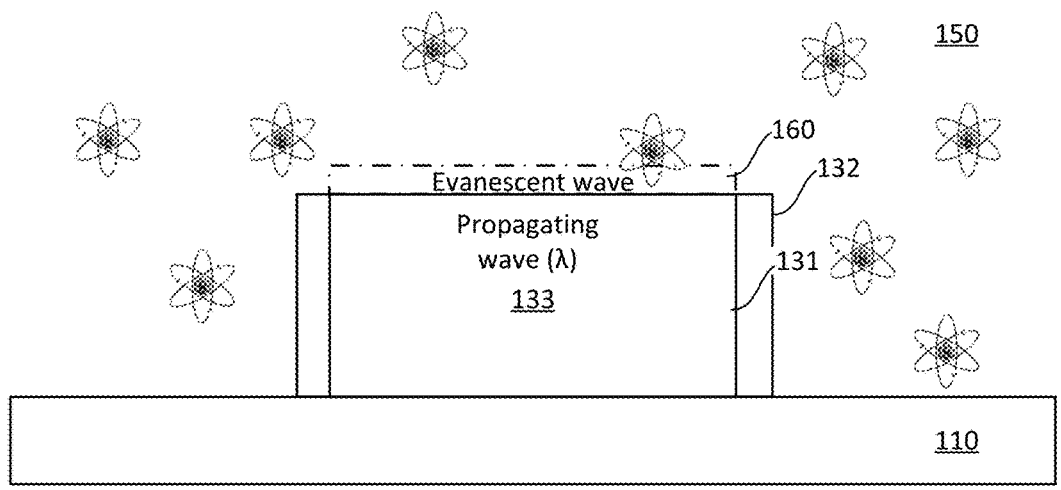

For example, FIGS. 1A-1B schematically illustrate a previously known interaction between an atomic vapor 150 (such as an alkali metal, e.g., rubidium or cesium) and a ridge waveguide 130 which is disposed on substrate 110. FIG. 1A illustrates a plan view of the waveguide 130, and FIG. 1B illustrates a cross-sectional view of the waveguide 130 along line 1B-1B shown in FIG. 1A. Waveguide 130 includes an elongated core 131 and cladding 132 which is disposed on the top and side surfaces of core 131 except in region 133 in which the cladding has been removed from the top surface of the core. Light of a selected wavelength $\lambda$ is input into ridge waveguide 130, and propagates along the length of the waveguide. Outside of region 133, cladding 132 substantially retains the light within core 131. Within region 133, an evanescent wave 160 extends from core 131 and interacts with vapor 150. As intended to be illustrated by the dash-dot line within FIG. 1B, the evanescent wave extends only a short distance from the top of waveguide core 131, and the amplitude of its electromagnetic field decreases exponentially as a function of the distance from the top of the waveguide core, for example with a length on the order of about 100 nm. For further details regarding an arrangement such as described with reference to FIGS. 1A-1B, see the following references, the entire contents of which are incorporated by reference herein: Stern et al., "Nanoscale light-matter interactions in atomic cladding waveguides," Nature Communications 4: 1548, 7 pages (2012); and Zetzker et al., "Atom-photon interactions in atomic cladded waveguides: Bridging atomic and telecom technologies," ACS Photonics 8(3): 879-886 (2021).

As recognized by the present inventor, the interaction between the atoms or molecules in vapor 150 and the light within waveguide 130 is limited both in its nature (e.g., that only an evanescent component 160 of the light, not a propagative component of the light within core 131, interacts with the vapor) and in its extent (e.g., that the volume of the vapor which interacts with the light is limited to only a thin, exponentially decaying area 160 immediately above the region 133 of the core 131 from which the cladding 132 is removed). As such, the volume of atoms interacting with the evanescent wave 160 is approximately proportional to the volume defined by the area of wave 160 times the length of region 133. Additionally, as recognized by the present inventor, previously known methods for sealing vapor 150 over waveguide 130 are not readily adapted to large-scale, consistent production. For example, as described in Stern and Zetzker, a large glass vapor cell is sealed to substrate 110 so as to trap the vapor over waveguide 130. This can require several manual steps, and add to cost and bulk of the device. Additionally, the volume and pressure of the vapor 150 within the resulting device and the alignment of the glass vapor cell to the waveguide may not be well controlled, leading to undesirable variations in performance from device to device.

Figure 2A:
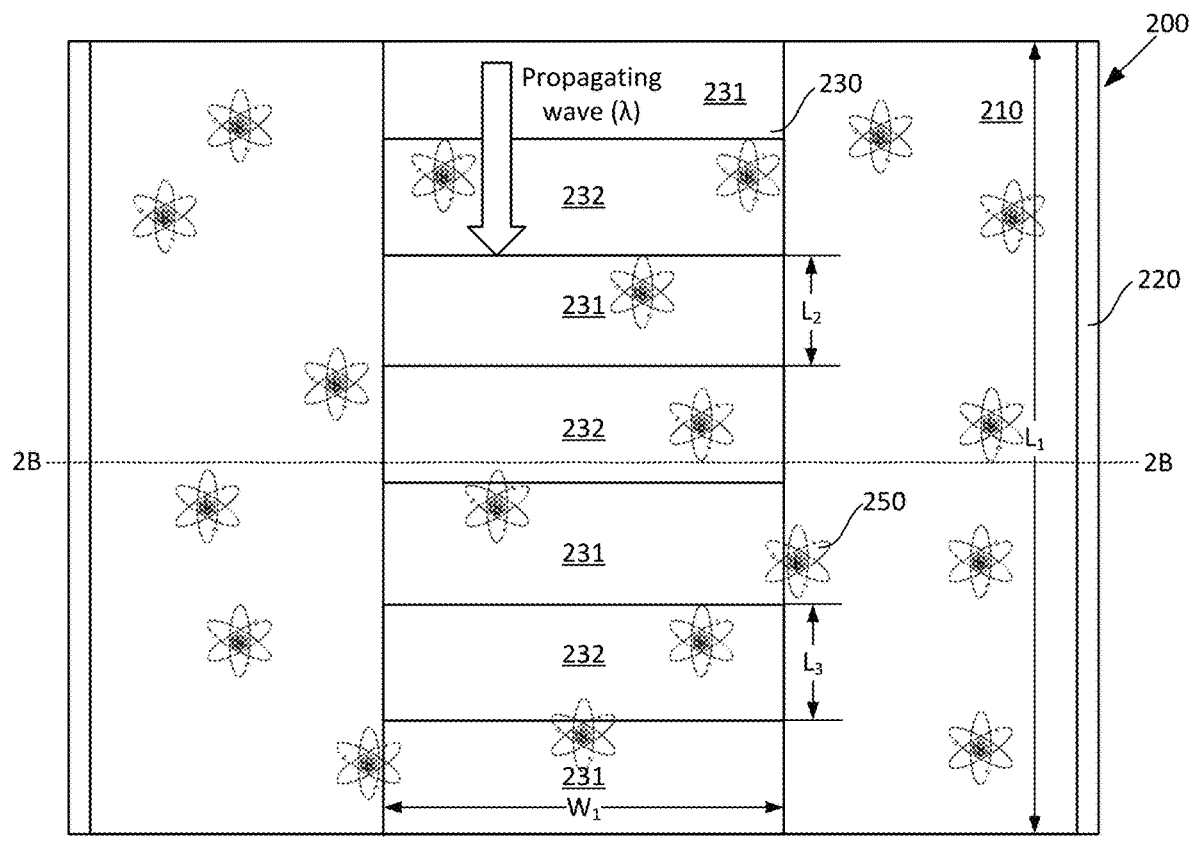
FIGS. 2A-2B schematically illustrate a physics package including an atomic or molecular vapor and a sub-wavelength grating (SWG) waveguide.
Figure 2B:
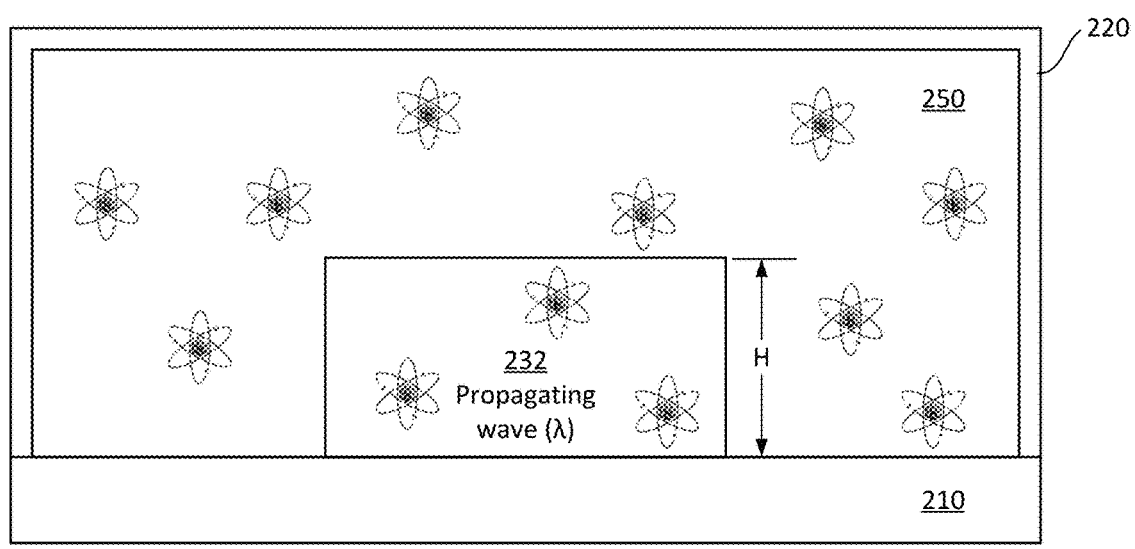

The present physics packages address these and other drawbacks associated with previously known arrangements such as described with reference to FIGS. 1A-1B. For example, FIGS. 2A-2B schematically illustrate a physics package 200 including an atomic or molecular vapor and a sub-wavelength grating (SWG) waveguide. FIG. 2A illustrates a plan view of the physics package 200, and FIG. 2B illustrates a cross-sectional view of the physics package 200 along line 2B-2B shown in FIG. 2A. Physics package 200 includes substrate 210, cell 220 sealed to the substrate and storing atomic or molecular vapor 250, and SWG waveguide 230 having a length $L_1$ and a width $W_1$ and disposed on the substrate. In examples provided herein with reference to FIGS. 2A-2B, 4A-4B, 5A-5G, 6A-6B, 7A-7B, 8, 9, and 10, the SWG waveguide of the present physics packages includes a plurality of grating segments that are spaced apart from one another and define a gap within the SWG waveguide, the vapor being located at least within the gap. For example, in the nonlimiting example illustrated in FIGS. 2A-2B, SWG waveguide 230 includes a plurality of gaps 232 which are located between the grating segments 231. The vapor 250 is located within gaps 232, and the light propagates through gaps 232, and as such the light propagates through vapor 250.

In some examples, each of grating segments 231 may have a height H, width $W_1$, and length $L_2$. Each of gaps 232 may have a height H, width $W_1$, and length $L_3$, where $L_3$ can be the same as or different than $L_2$. In some examples, the period L2+L3 is less than wavelength/(2*effective index). The duty cycle L2/(L2+L3) affects how much field is in the atomic cladding as opposed to in the waveguide. Increasing the field in the cladding improves coupling to the vapor. Within the effective medium theory, the SWG waveguide may be treated as a planar waveguide with a smaller effective index, and it has substantially the same bandwidth as planar waveguide. For further details regarding SWG waveguides, see Cheben et al., "Subwavelength integrated photonics," Nature 560(7720): 565-572 (2018), the entire contents of which are incorporated herein.

Although not specifically illustrated in FIGS. 2A-2B, physics package 200 also includes a first optical coupler configured to couple light into the SWG waveguide such that the light propagates through the vapor located within the gaps 232 and interacts with the atoms or molecules in the vapor located within the gaps 232; and a second optical coupler configured to receive light from the SWG waveguide. For further details regarding SWG waveguides having configurations such as illustrated in FIGS. 2A-2B, see Bock et al., "Subwavelength grating periodic structures in silicon-on-insulator: a new type of microphotonic waveguide," Optics Express 18(9): 20251-20262 (2010), the entire contents of which are incorporated by reference herein.

As recognized by the present inventor, use of a SWG waveguide such as illustrated in FIGS. 2A-2B (or other variation of which such described elsewhere herein) dramatically increases the cross-section of atoms or molecules in vapor 250 interacting with light within waveguide 230 as compared to the cross-section of atoms or molecules in vapor 250 interacting with evanescent wave 160 from ridge waveguide 130 described with reference to FIGS. 1A-1B. For example, the cross-section of atoms of atoms or molecules in vapor 250 interacting with light within waveguide 230 is approximately proportional to the total volume of gaps 232 within waveguide 230, e.g., to the volume $H \times W_1 \times L_3$ of each gap 232, multiplied by the number of gaps within waveguide 230. Accordingly, such a cross section may be orders of magnitude greater than that of waveguide 130, resulting in a significantly larger interaction between the atoms or molecules and the light. Additionally, because the mode of light which the SWG waveguide 230 is propagative, the light's electromagnetic field may be orders of magnitude greater than that of evanescent wave 160 described with reference to FIGS. 1A-1B. Additionally, the atoms or molecules within vapor 250 within SWG waveguide 230 may interact with a relatively uniform electromagnetic field of the propagative mode, regardless of their specific positions within gap 232, whereas the interactions between atoms or molecules and evanescent wave 160 are very strongly dependent on location because the evanescent wave exponentially decays as a function of distance from waveguide 130. In this example and other examples herein, although the focus may be on interactions between the propagating light's electromagnetic field and the atoms or molecules in vapor 250, the light's evanescent field also may interact with the atoms or molecules which may even further increase the cross-section of the interaction.

The present inventor has recognized that the significantly increased amplitude of the light's electromagnetic field that interacts with atoms or molecules in the present physics packages can significantly improve the use of such interactions in practical applications. Illustratively, in electromagnetically induced transparency of an atomic or molecular vapor, the residual absorption (which it may be useful to reduce or minimize) is proportional to the inverse of the electromagnetic field amplitude squared. As another illustrative example, the noise equivalent field of a Rydberg electric field sensor (which it may be useful to reduce or minimize) is proportional to the inverse of the electromagnetic field amplitude squared.

In this regard, note that a wide variety of atomic or molecular vapors 250 can be used with the present physics packages. In some examples, the atoms or molecules in the vapor have at least first and second Rydberg energy levels, and optionally can have numerous Rydberg energy levels. In nonlimiting examples, the vapor may include (or may consist essentially of) atoms of an alkali metal, such as rubidium (e.g., $^{85}$Rb or $^{87}$Rb), cesium (e.g., $^{133}$Cs or $^{137}$Cs), lithium, sodium, or potassium. In other nonlimiting examples, the vapor may include (or may consist essentially of) molecules such as acetylene or HCN. In some examples, the atomic or molecular vapor 250 may be mixed together with a buffer gas. Buffer gases are often used in vapor cells to reduce collisions between atoms and the wall. Helium, neon, argon, krypton, xenon, nitrogen, and ethane are nonlimiting examples of buffer gases. The present physics packages may be used at any suitable temperature at which the atomic or molecular vapor 250 is in the gas phase. For example, while rubidium and cesium are gases at room temperature and the present physics packages therefore may be used at room temperature for these gases, the present physics packages may include (or be used with) a heater which is controlled to maintain the atomic or molecular vapor at a suitable temperature above room temperature, e.g., so as to increase the density of atoms in the vapor.

Figure 3A:
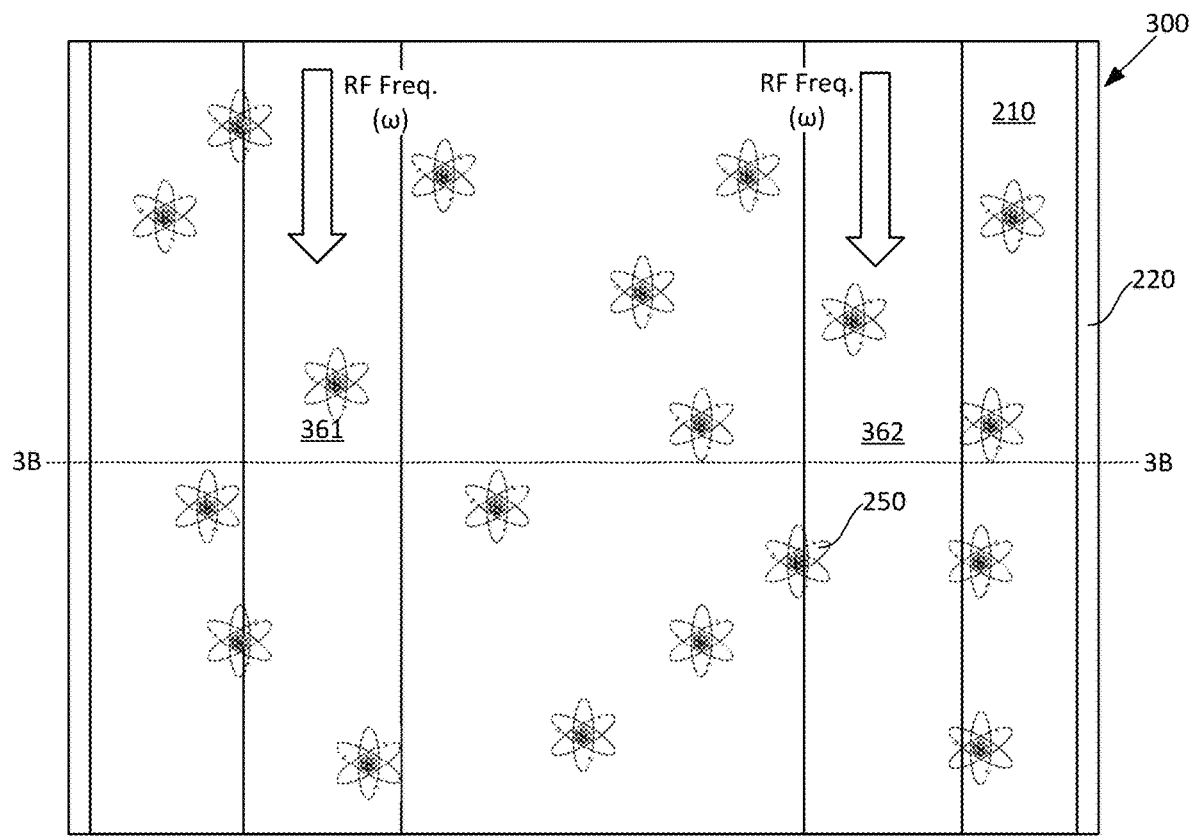
FIGS. 3A-3B schematically illustrate an example physics package including an atomic or molecular vapor and radio frequency (RF) waveguides.
Figure 3B:
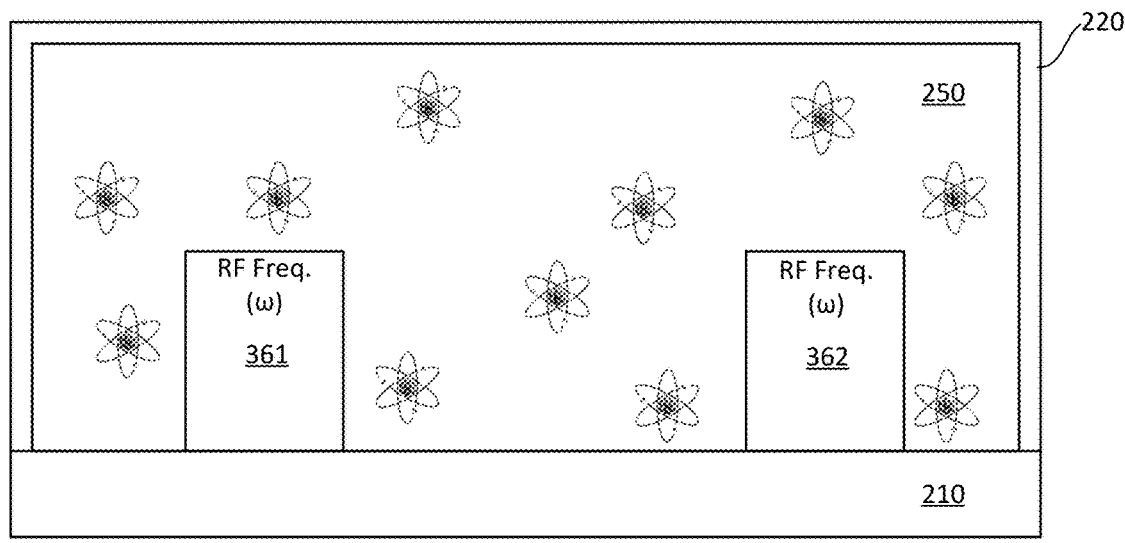

In some examples provided herein, an RF waveguide may be integrated into a physics package similar to that described with reference to FIGS. 2A-2B. For example, FIGS. 3A-3B schematically illustrate an example physics package 300 including an atomic or molecular vapor 250 and a radio frequency (RF) waveguide including RF electrode(s) 361 and/or 362. FIG. 3A illustrates a plan view of the physics package 300, and FIG. 3B illustrates a cross-sectional view of the physics package 300 along line 3B-3B shown in FIG. 3A. Physics package 300 includes substrate 210 and cell 220 sealed to the substrate and storing atomic or molecular vapor 250, in a manner such as described elsewhere herein. RF electrodes 361 and 362 are disposed on substrate 210 and sized and spaced to carry RF signal(s) at a selected frequency ω, and with a selected bandwidth, through vapor 250. Although two RF electrodes are illustrated, it should be appreciated that any suitable number of one or more RF waveguides, each including one or more RF electrodes, may be included within physics package 300, and that each such RF electrode may carry a different RF signal that one or more other of such RF electrodes, or alternatively the RF electrodes may carry the same RF signals as one another. Although not specifically illustrated in FIGS. 3A-3B, physics package 300 also includes a first RF coupler configured to couple an RF signal into the first RF electrode 361 (and, if present, the second RF electrode 362); and a second RF coupler configured to receive the RF signal from the first RF electrode (and, if present, the second RF electrode). The RF signal(s) may perturb the energy levels of the atoms or molecules in the vapor 250.

As recognized by the present inventor, RF electrode(s) which are integrated into a physics package may have significantly lower power requirements to drive an RF field, for example in a rubidium atomic frequency standard, than previously known RF electrodes. The form factor of the present RF electrodes is also reduced and readily scalable in manufacturing.

Figure 4A:
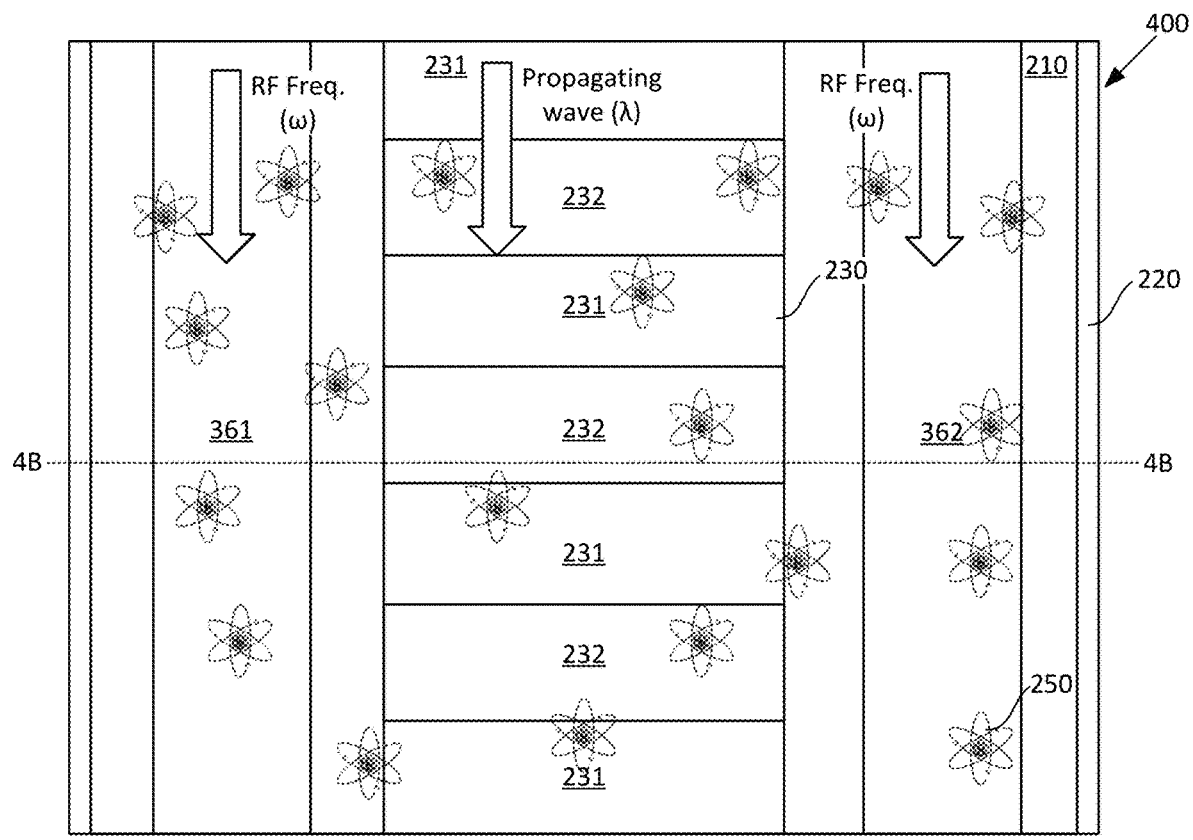
FIGS. 4A-4B schematically illustrate an example physics package including an atomic or molecular vapor, a SWG waveguide, and an RF waveguide.
Figure 4B:
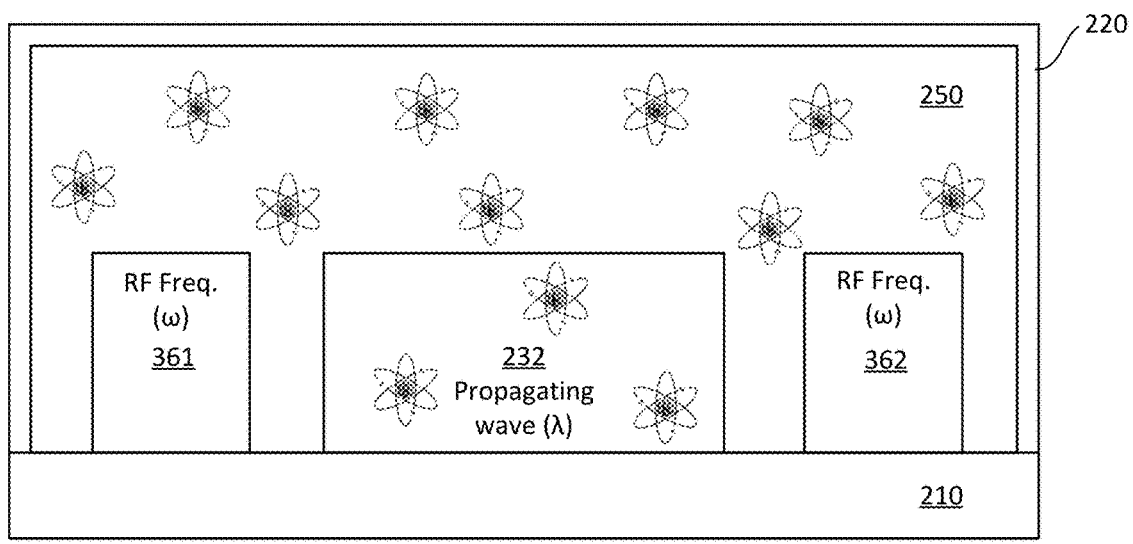

In still other examples, the present physics packages include both a SWG waveguide and RF waveguide(s). For example, FIGS. 4A-4B schematically illustrate an example physics package 400 including an atomic or molecular vapor, a SWG waveguide, and an RF waveguide. FIG. 4A illustrates a plan view of the physics package 400, and FIG. 4B illustrates a cross-sectional view of the physics package 400 along line 4B-4B shown in FIG. 4A. Similarly as physics package 200 described with reference to FIGS. 2A-2B, physics package 400 includes substrate 210, cell 220 sealed to the substrate and storing atomic or molecular vapor 250, and SWG waveguide 230 including grating segments 231 and gaps 232 within which the vapor 250 is located and through which the light propagates. Additionally, similarly as physics package 300 described with reference to FIGS. 3A-3B, physics package 300 further includes first RF electrode 361 disposed on the substrate 210; and second RF electrode 362 disposed on the substrate. In the nonlimiting example illustrated in FIGS. 3A-3B, the SWG waveguide 230 is disposed between the first RF electrode 361 and the second RF electrode 362, although other suitable configurations may be used. In this regard, the RF electrodes 361, 362 are used as a capacitor, so the electric field amplitude seen by the atomic or molecular vapor between the electrodes is inversely proportional to the separation between the electrodes. As such, placing the electrodes closer to one another (and thus closer to the SWG waveguide 230) can increase the electric field amplitude. Although not specifically illustrated in FIGS. 4A-4B, physics package 400 also includes a first optical coupler configured to couple light into the SWG waveguide 230 such that the light propagates through the vapor located within the gaps 232 and interacts with the atoms or molecules in the vapor located within the gaps 232; a second optical coupler configured to receive light from the SWG waveguide; a first RF coupler configured to couple RF signal(s) into the first RF electrode 361 and the second RF electrode 362; and a second RF coupler configured to receive RF signal(s) from the first RF electrode and second RF electrode.

In some examples, the RF signal(s) perturb the interaction between the light and the atoms or molecules in the vapor 250 within the gaps 232. Illustratively, the light within SWG waveguide 230 and the RF signal within RF electrodes 361, 362 propagate collinearly in a manner that is useful in many practical applications that use atomic or molecular vapors. Because the present physics packages may be consistently manufactured at scale and are connectorized, they may be readily integrated into a variety of real-world, practical applications. In one purely illustrative example, physics package 400 may be used as a Rydberg electric field sensor which is port-fed by an antenna. The field enhancement factor is proportional to the square root of the antenna gain. The field enhancement, and therefore sensitivity of the Rydberg electric field sensor, may be further enhanced using one or more planar RF cavities which are used in place of RF electrode(s) 361 and/or 362, but which may be fed by an RF waveguide. For a nonlimiting example of an RF cavity that may be used in place of RF electrodes 361, 362, see Santamaria Botello et al., "Comparison of noise temperature of Rydberg-atom and electronic microwave receivers," arXiv preprint arXiv:2209.00908v2, 24 pages (2022), the entire contents of which are incorporated by reference herein.

Physics packages such as described with reference to FIGS. 2A-2B, 3A-3B, and 4A-4B may be fabricated in any suitable manner. For example, FIGS. 5A-5G schematically illustrate example operations and structures during an example method of making a physics package including an atomic or molecular vapor, a SWG waveguide, and/or an RF waveguide. Although fabrication of physics package 400 including both a SWG waveguide and an RF waveguide is described, it will be appreciated that the operations for forming the SWG waveguide may be omitted if it is desired to prepare physics package 300, and that the operations for forming the RF waveguide may be omitted if it is desired to prepare physics package 200.

Figure 5A:
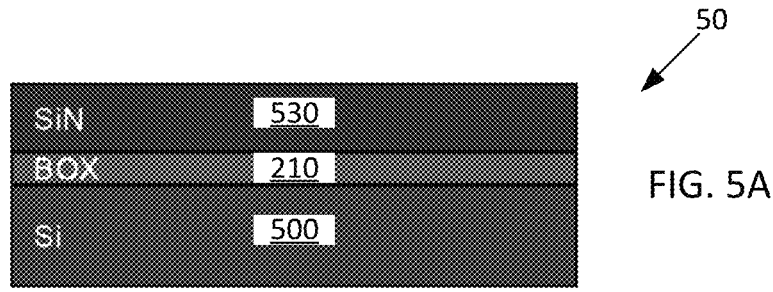
FIGS. 5A-5G schematically illustrate example operations and structures during an example method of making a physics package including an atomic or molecular vapor, a SWG waveguide, and/or an RF waveguide.
Figure 5B:
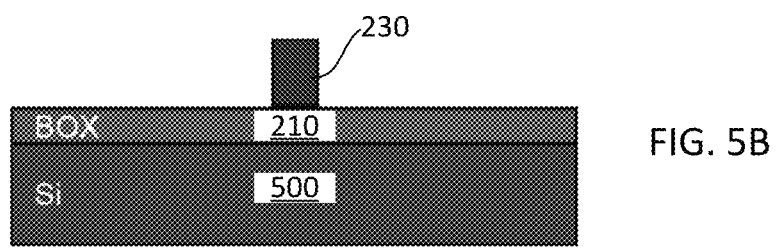

Forming the physics package may include disposing a sub-wavelength grating (SWG) waveguide having a length and a width on a substrate. For example, turning now to FIG. 5A, structure 50 includes a handling wafer 500 (illustratively, silicon) on which are disposed a buried oxide layer (BOX, illustratively silicon dioxide) corresponding to substrate 210, and a layer of material 530 within which the SWG waveguide will be formed (illustratively, silicon nitride). As illustrated in FIG. 5B, material 530 may be patterned in any suitable manner to form SWG waveguide 230 or other SWG waveguide described herein, illustratively photolithography. Although not specifically illustrated in FIG. 5B, the SWG waveguide 230 may include a plurality of grating segments that are spaced apart from one another and define a gap within the SWG waveguide within which the vapor 250 later may be located and through which light in the waveguide may propagate.

Figure 5C:
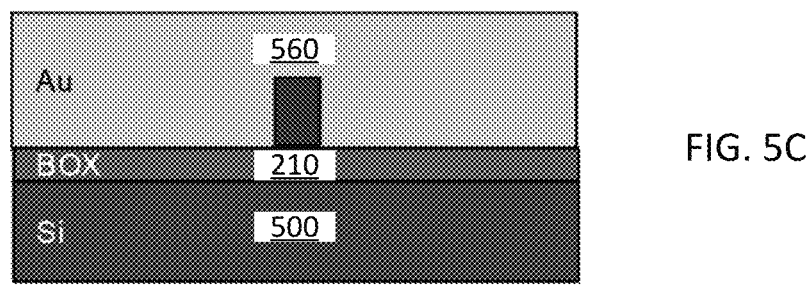
Figure 5D:
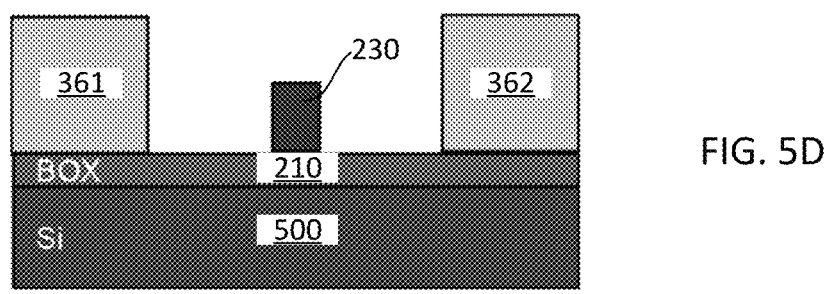

Forming the physics package optionally further may include disposing at least one RF waveguide on the substrate, illustratively a first RF electrode and a second RF electrode. In some examples, the SWG waveguide is disposed between the first RF electrode and the second RF electrode in a manner such as described with reference to FIGS. 4A-4B. The RF electrode(s) may be formed in any suitable manner. For example, as illustrated in FIG. 5C, a conductive material 560 such as a metal (illustratively, gold, titanium, chromium, copper, aluminum, nickel, platinum, or silver) may be disposed over substrate 210 and over waveguide 230. The conductive material may be deposited in any suitable manner, such as e-beam evaporation, thermal evaporation, electroplating, chemical vapor deposition, or sputter deposition. As illustrated in FIG. 5D, the conductive material may be patterned in any suitable manner to form first and second waveguides 361, 362, illustratively photolithography. Alternatively, a photomask may be used to selectively deposit waveguides 361 and 362 at desired locations on substrate 210.

Figure 5E:
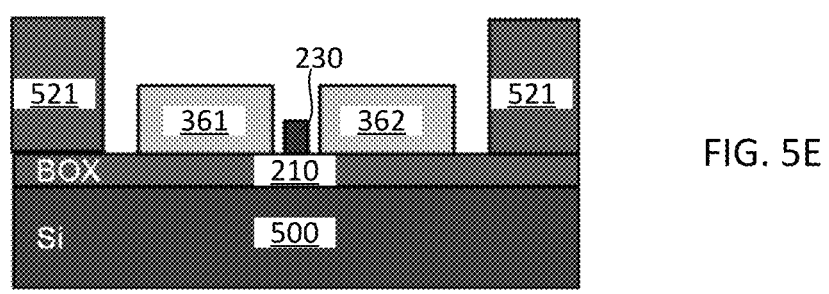

It will be appreciated that operations such as described with reference to FIGS. 5A-5D are compatible with standard foundry processes, and as such at least these operations readily may be performed at scale in a foundry, with high reproducibility and low per-unit cost. Additionally, at least a portion of cell 220 for storing the vapor may be formed as part of the same workflow as the SWG waveguide and RF electrodes (e.g., at the foundry). For example, as illustrated in FIG. 5E, a spacer layer 521 corresponding to a sidewall of cell 220 may be formed of a suitable material, illustratively silicon nitride or silicon dioxide. Illustratively, substrate 210 may be deposited to be higher than illustrated in FIG. 5A, and then subsequently etched to create a trench for the RF electrodes and optical waveguide, where the remaining portion of substrate 210 outside of the trench forms spacer layer 521. Alternatively, spacer layer 521 may be formed separately (e.g., via etching) and then anodically bonded to substrate 210. Optionally, a passivation layer (not specifically illustrated), such as aluminum oxide, may be disposed at least over SWG waveguide 230 and RF electrodes 361, 362 so as to inhibit chemical reactivity with vapor 250.

Figure 5F:
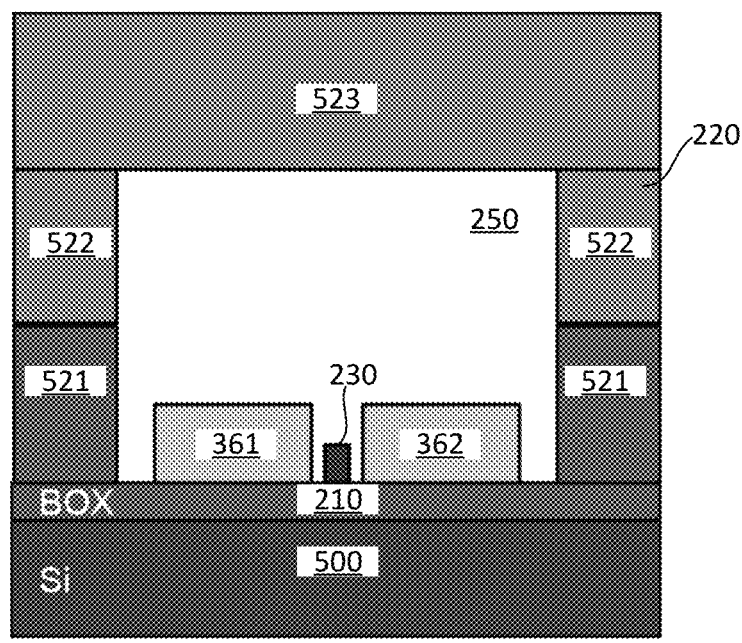

The vapor 250 then may be sealed within at least within the gap within the SWG waveguide. For example, as illustrated in FIG. 5F, vapor 250 may be disposed over waveguide 230 and a cover 523 (such as a glass window) then coupled to the spacer layer to form cell 220. Optionally, one or more additional spacer layer(s) 522 (such as glass or silicon) may be used to couple cover 523 to spacer layer 521. Spacer layer 522 may be formed using a similar process as spacer layer 521, and as part of the same workflow (e.g., at the foundry). In some examples, cover 523 is bonded to spacer layer 521 using anodic bonding. In this regard, an electrode (such as chromium) for use in such anodic bonding may be integrated into the structure shown in FIG. 5F in any suitable manner. For example, the electrode may be formed between the operations illustrated in FIGS. 5D and 5E or between the operations illustrated in FIGS. 5E and 5F. For further details regarding use of an electrode to facilitate anodic bonding, see Daschner et al., "Triple stack glass-to-glass anodic bonding for optogalvanic spectroscopy cells with electrical feedthroughs," Applied Physics Letters 105 (4): 041107, 4 pages (2014), the entire contents of which are incorporate by reference herein. A variety of different methods may be used to provide the atomic or molecular vapor 250 within the physics package. For further details regarding such methods, and for further details regarding using anodic bonding to bond glass to silicon to seal an atomic or molecular vapor within a cell, see Kitching, "Chip-scale atomic devices," Appl. Phys. Rev. 5: 031302, 38 pages, (2018), the entire contents of which are incorporated by reference herein.

Figure 5G:
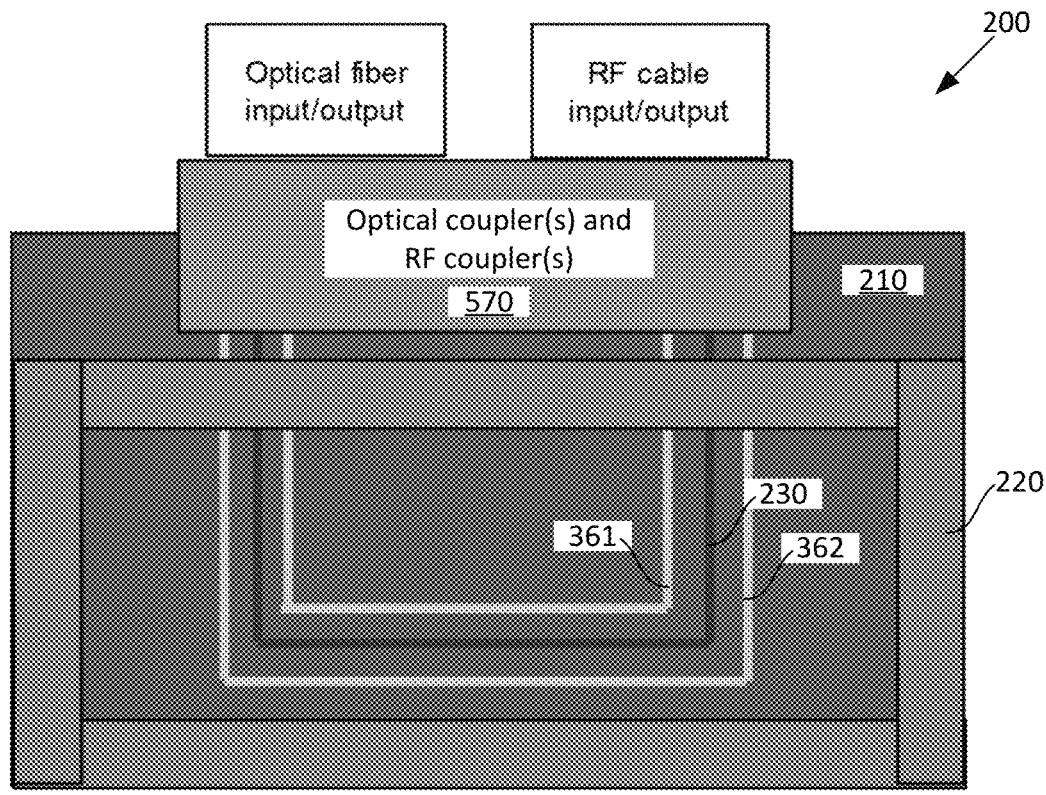

Referring now to FIG. 5G, which shows an example plan view of selected components of physics package 200 (cover 523 being omitted) the physics package may be connectorized in any suitable manner such that light may be input to, and output from, SWG waveguide 230 and such that RF signal(s) may be input to, and output from, RF electrodes 361, 362. For example, the method of making physics package 200 may include coupling a first optical coupler to the SWG waveguide 230 such that light input to the first optical coupler propagates through the gap; and coupling a second optical coupler to the SWG waveguide 230 to receive light from the SWG waveguide. Additionally, the method of making physics package 200 may include coupling a first RF coupler to the first RF electrode 361 and the second RF electrode 362 such that an RF signal applied to the first RF coupler propagates through the first RF electrode and the second RF electrode; and coupling a second RF coupler to the first RF electrode and the second RF electrode so as to receive the RF signal that propagates through the first RF electrode and the second RF electrode. For nonlimiting examples of optical couplers that respectively may self-align to the SWG waveguide, see Mu et al., "Edge couplers in silicon photonic integrated circuits," Applied Sciences 10: 1538, 29 pages (2020), the entire contents of which are incorporated by reference herein. The optical coupler(s) and RF couplers 570 may be coupled to standard (or non-standard) optical fiber and RF cable input/output ports via which the physics package 200 respectively may be coupled to an optical source/detector and to an RF source.

From the foregoing, it will be appreciated that the present physics packages may be produced in high volume using manufacturing operations which are compatible with standard foundry processes. It will also be appreciated that the present physics packages obviate the need for cumbersome, manual alignment to optical breadboards such as previously known. Instead, the present physics packages may be used in a plug-and-play manner with a wide variety of fiber optic inputs and/or a wide variety of RF inputs.

Figure 6A:
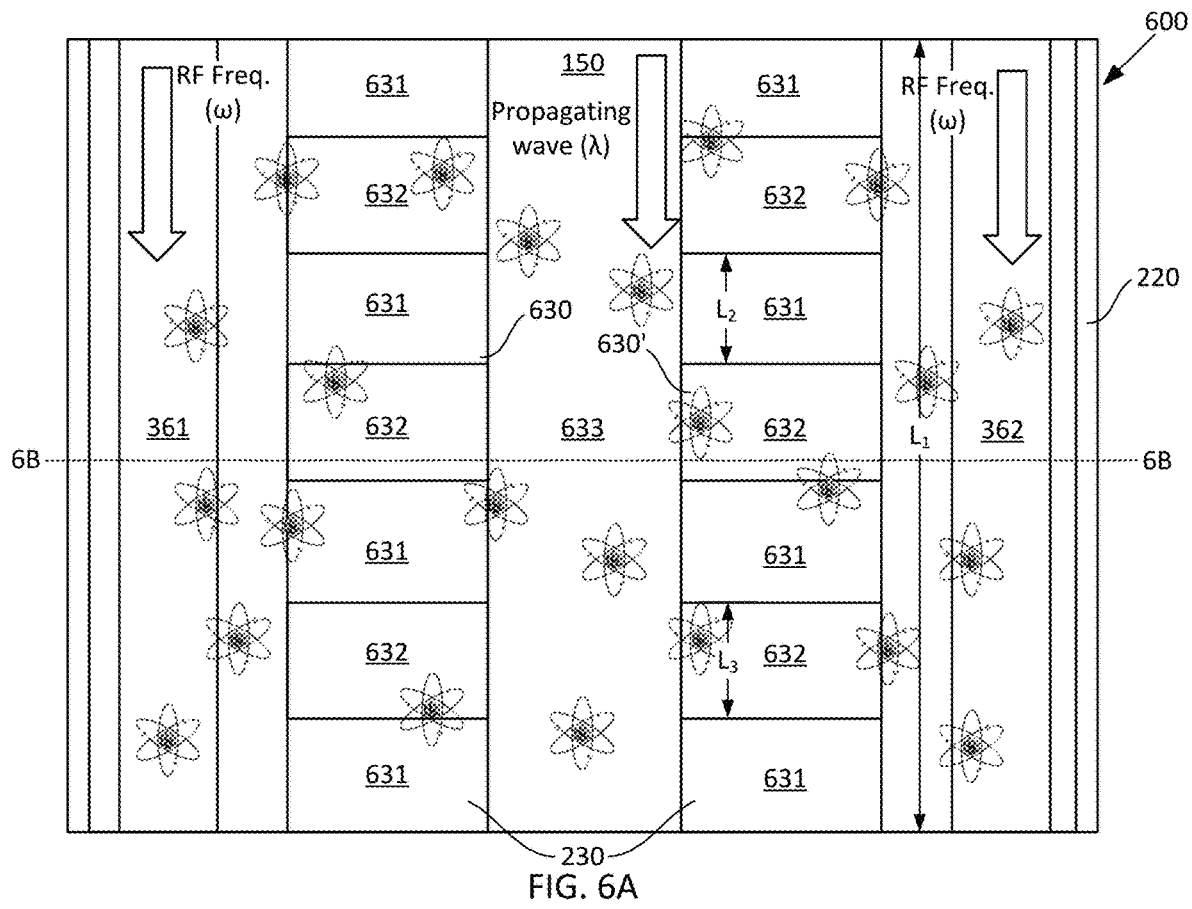
FIGS. 6A-6B schematically illustrate an example physics package including an atomic or molecular vapor, an alternative SWG waveguide, and an RF waveguide.
Figure 6B:
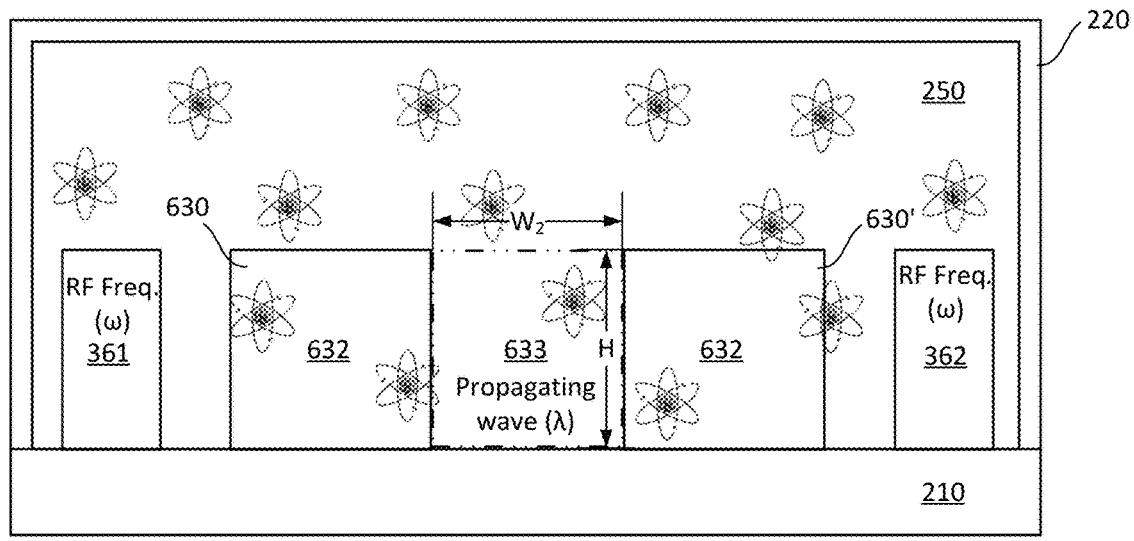

As noted further above, a variety of different SWG configurations suitably may be used in the present physics packages besides the nonlimiting example described with reference to FIGS. 2A-2B, 4A-4B, and 5A-5G. For example, FIGS. 6A-6B schematically illustrate an example physics package 600 including an atomic or molecular vapor, an alternative SWG waveguide, and an RF waveguide. FIG. 6A illustrates a plan view of the physics package 600, and FIG. 6B illustrates a cross-sectional view of the physics package 600 along line 6B-6B shown in FIG. 6A. Physics package 600 may be configured similarly as physics package 400, e.g., may include substrate 210, cell 220, SWG waveguide 230, vapor 250, RF electrodes 361, 362, and suitable optical and RF couplers.

In the nonlimiting example of SWG waveguide 230 illustrated in FIGS. 6A-6B, the segments of the SWG waveguide include a first plurality 630 of segments 631 and a second plurality 630' of segments 631 that is spaced apart from the first plurality of segments by a gap 633 within which the vapor is located, and through which the light propagates. As illustrated in FIGS. 6A-6B, the segments 631 of the first plurality 630 of segments are separated from one another by a first plurality of additional gaps 632, and the segments 631 of the second plurality 630' of segments are separated from one another by a second plurality of additional gaps 632. Similarly as described with reference to FIGS. 2A-2B, waveguide 230 may have a length $L_1$, each of grating segments 631 may have a height H, width $W_1$, and length $L_2$. Each of gaps 632 may have a height H, width $W_1$, and length $L_3$, where $L_3$ can be the same as or different than $L_2$. The first plurality 630 of segments and the second plurality 630' of segments are separated from one another by gap 633 of width $W_2$ (gap 633 being denoted in FIG. 6B by the dash-double dotted line). The heights, widths, and lengths of segments 631, gaps 632, and gap 633 may be selected such that light within waveguide 230 is substantially confined to propagate along the length of gap 633. The vapor 250 is located within gap 633, and the light propagates through gap 633, and as such the light propagates through vapor 250. For example, the cross-section of atoms of atoms or molecules in vapor 250 interacting with light within gap 633 is approximately proportional to the total volume of gap 633, e.g., to the volume $H \times W_2 \times L$ of gap 633. Accordingly, the atoms or molecules may interact with the light over an even greater cross-section than described with reference to FIGS. 1A-1B and 2A-2B. For further details regarding SWG waveguides having configurations such as illustrated in FIGS. 6A-6B, see Urbonas et al., "Low-loss optical waveguides made with a high-loss material," Light: Science and Applications 10: 15, 7 pages (2021), the entire contents of which are incorporated by reference herein.

Figure 7A:
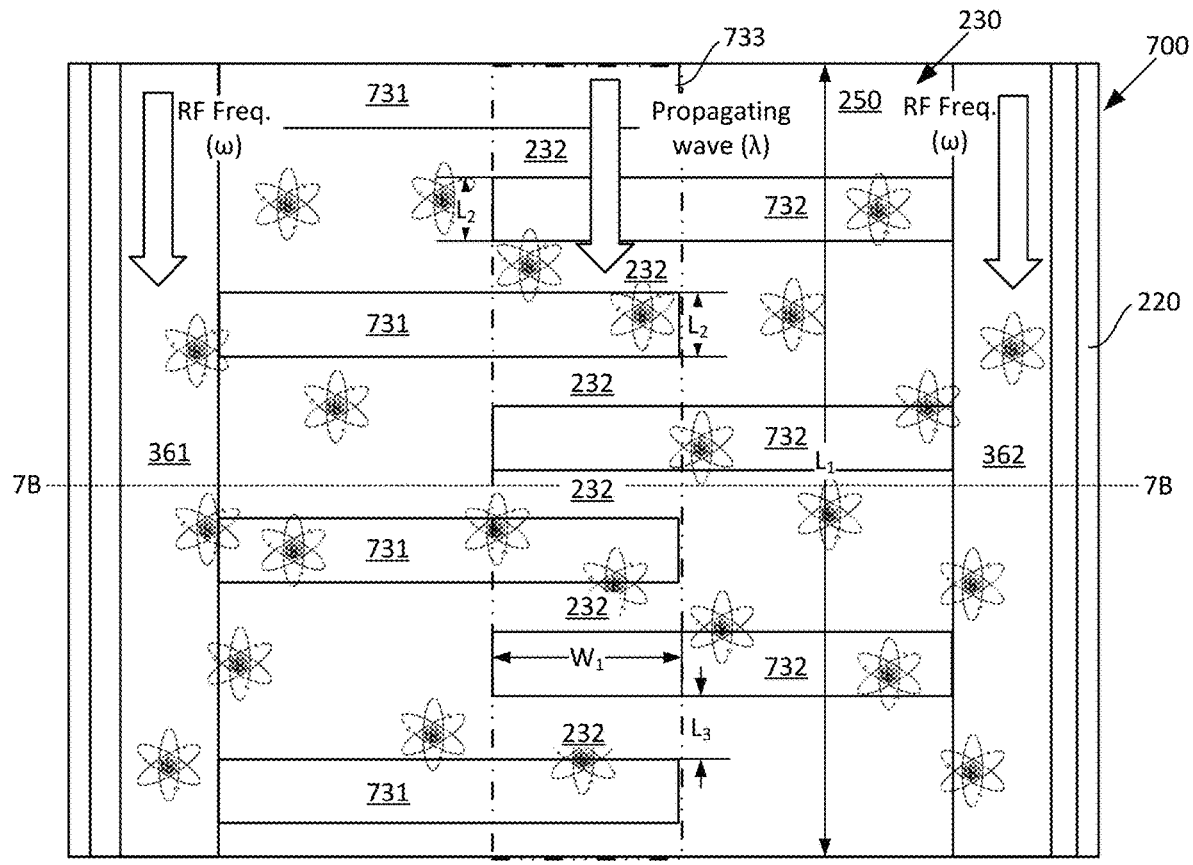
FIGS. 7A-7B schematically illustrate an example physics package including an atomic or molecular vapor, another alternative SWG waveguide, and an RF waveguide.
Figure 7B:
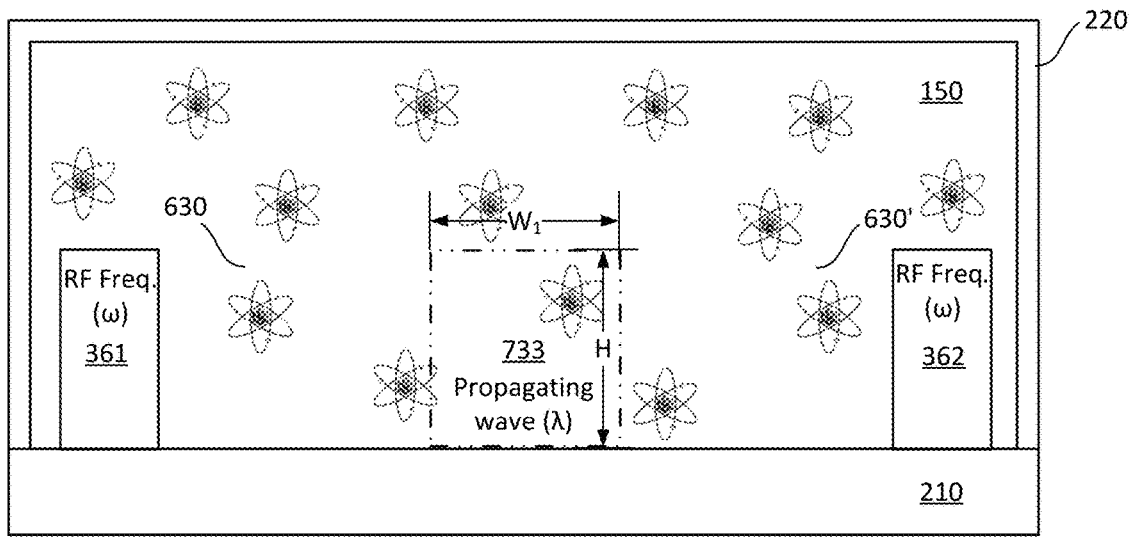

FIGS. 7A-7B schematically illustrate an example physics package 700 including an atomic or molecular vapor, another alternative SWG waveguide, and an RF waveguide.

In the nonlimiting example illustrated in FIGS. 7A-7B the segments of the SWG waveguide are interdigitated. FIG. 7A illustrates a plan view of the physics package 700, and FIG. 7B illustrates a cross-sectional view of the physics package 700 along line 7B-7B shown in FIG. 7A. Physics package 700 may be configured similarly as physics package 400, e.g., may include substrate 210, cell 220, SWG waveguide 230, vapor 250, RF electrodes 361, 362, and suitable optical and RF couplers. In the nonlimiting example of SWG waveguide 230 illustrated in FIGS. 7A-7B, the segments of the SWG waveguide include a first plurality of segments 731 and a second plurality of segments 732 that are interdigitated with one another in a region 733 including gaps 734 within which the vapor is located, and through which the light propagates.

Region 733 may be configured similarly as described with reference to FIGS. 2A-2B, e.g., includes a plurality of grating segments that are spaced apart from one another and define a gap within the SWG waveguide, the vapor being located at least within the gap. For example, in the nonlimiting example illustrated in FIGS. 7A-7B, within region 733 SWG waveguide 230 includes a plurality of gaps 232 which are located between respective grating segments 731 and 732. Within region 733, each of grating segments 731 and 732 may have a height H, width $W_1$, and length $L_2$, while the grating segments themselves may have a width that is larger than region 733. Each of gaps 232 may have a height H, width $W_1$, and length $L_3$, where $L_3$ can be the same as or different than $L_2$. The vapor 250 is located within gaps 232, and the light propagates through gaps 232, and as such the light propagates through vapor 250. Similarly as described with reference to FIGS. 2A-2B, the heights, widths, and lengths of segments 731 and 732 and gaps 232 within region 733 may be selected such that light within region 733 of waveguide 230 is substantially confined to propagate along the length of region 733. The vapor 250 is located within gaps 232 of region 733, and the light propagates through such gaps, and as such the light propagates through vapor 250. The cross-section of atoms of atoms or molecules in vapor 250 interacting with light within waveguide 230 is approximately proportional to the total volume of gaps 232 within waveguide 230, e.g., to the volume $H \times W_1 \times L_3$ of each gap 232, multiplied by the number of gaps within waveguide 230. Accordingly, such a cross section may be orders of magnitude greater than that of waveguide 130, resulting in a significantly larger interaction between the atoms or molecules and the light. Accordingly, the atoms or molecules may interact with the light over a cross-section which is significantly greater than described with reference to FIGS. 1A-1B, and similar to that described with reference to FIGS. 2A-2B. As an additional benefit of the example shown in FIGS. 7A-7B, the waveguide may be undercut so as to increase the total number of atoms overlapping with the optical field. Other benefits of this example may be similar to those described with reference to FIGS. 2A-2B. For further details regarding SWG waveguides having configurations such as illustrated in FIGS. 7A-7B, see Taurel et al., "Sub-wavelength grating interdigitated combs as photonic waveguides," Optics Letters 44(15): 3869-3872 (2019), the entire contents of which are incorporated by reference herein.

Figure 8:
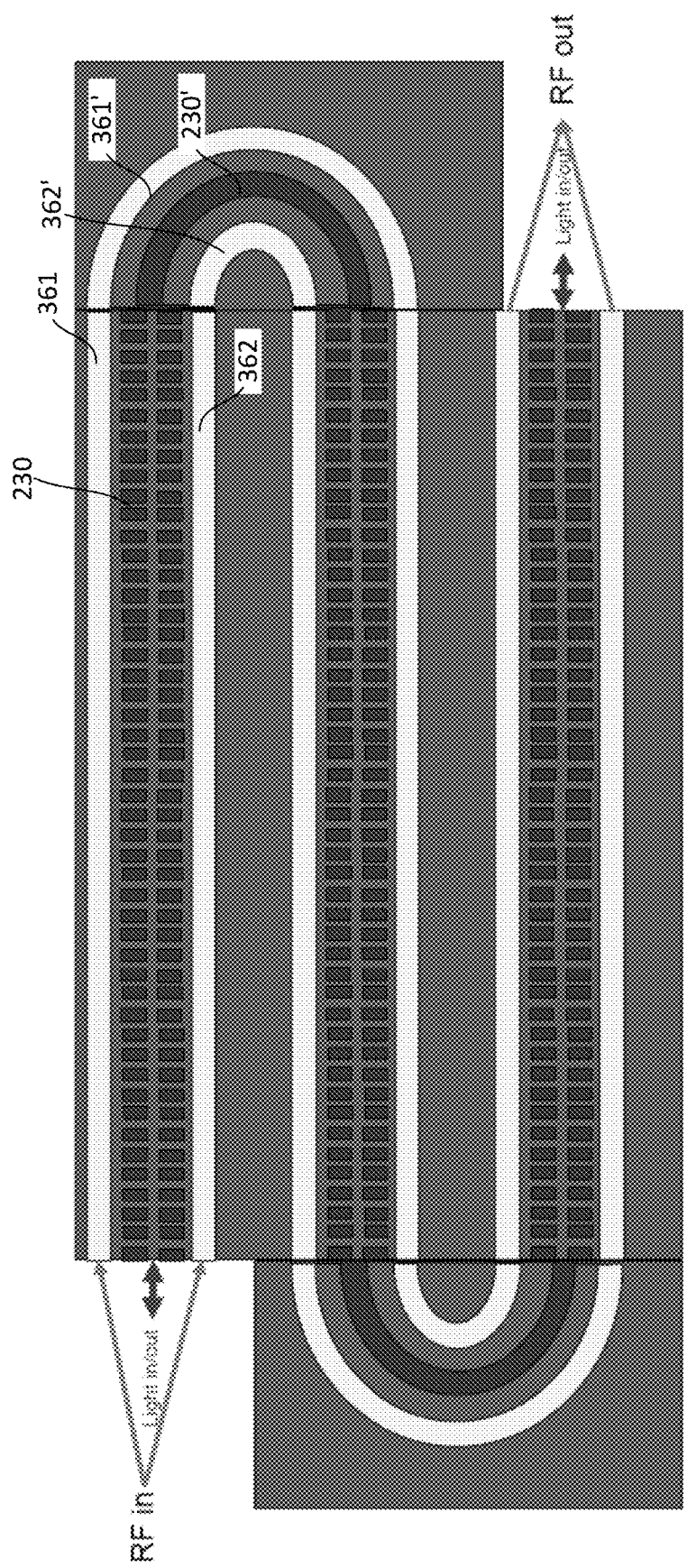
FIG. 8 schematically illustrates another alternative SWG waveguide and alternative RF waveguide that may be used in a physics package such as provided herein.

SWG waveguides and/or RF waveguides such as described with reference to FIGS. 2A-2B, 3A-3B, 4A-4B, 5A-5G, 6A-6B, and 7A-7B may be suitably modified, for example so as to increase their length and thus even further increase the cross-section of interaction between the atoms or molecules in vapor 250 and the light within the SWG waveguide and/or the RF signal within the RF waveguide. For example, FIG. 8 schematically illustrates another alternative SWG waveguide and alternative RF waveguide that may be used in a physics package such as provided herein. The example shown in FIG. 8 includes SWG waveguide 230 which may be configured in a manner such as described with reference to FIG. 2A-2B, 4A-4B, 5A-5G, 6A-6B, or 7A-7B (the nonlimiting example shown in FIG. 8 including the SWG waveguide described with reference to FIGS. 6A-6B); and RF electrodes 361, 362 which may be configured in a manner such as described with reference to FIG. 3A-3B, 4A-4B, 5A-5G, 6A-6B, or 7A-7B. The modified SWG waveguide 230 and modified RF electrodes 361, 362 respectively have serpentine paths which include any suitable number of curved segments 230', 361', 362' that increase the length of interaction of the optical and RF fields with the atoms or molecules. Optionally, the curved segments 230' may include ridge optical waveguides instead of SWG waveguides, so as to reduce or minimize bend losses.

Figure 9:
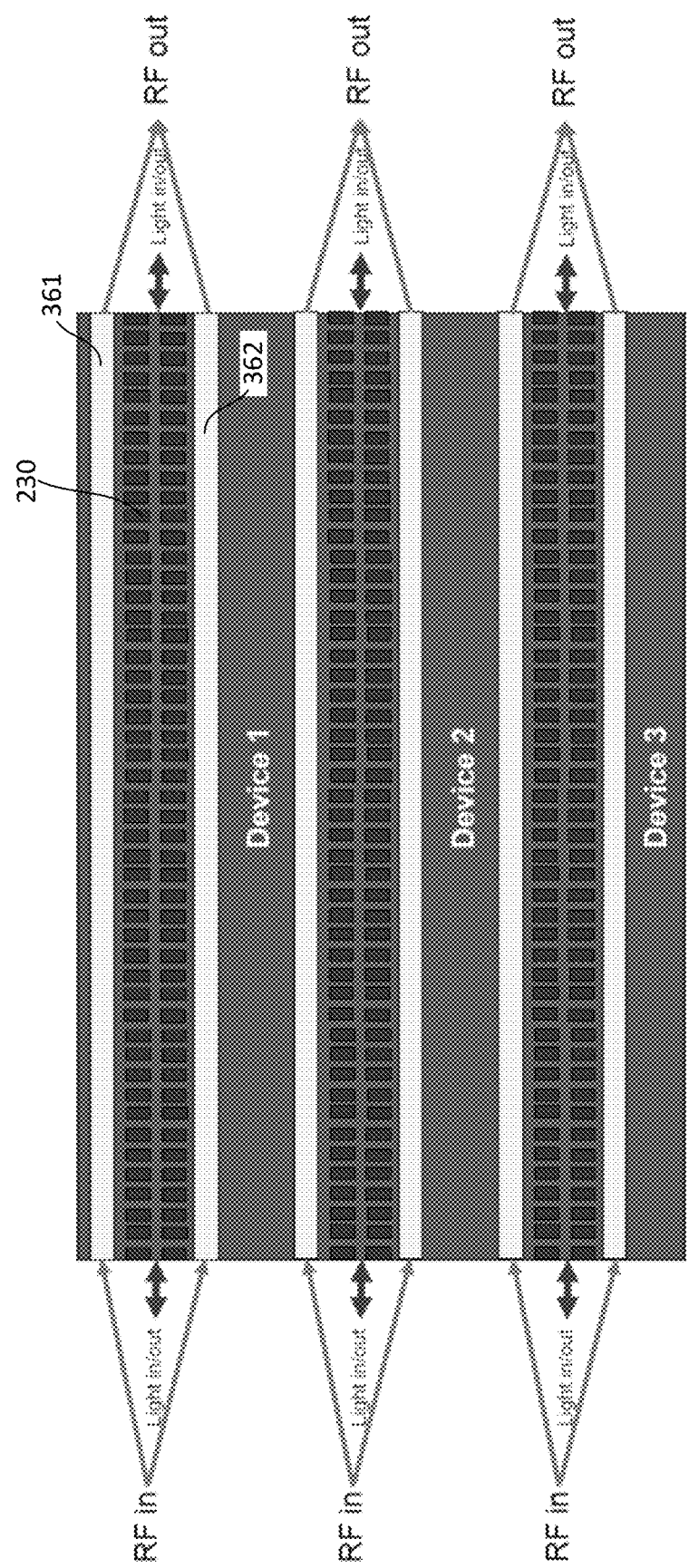
FIG. 9 schematically illustrates an alternative arrangement of SWG waveguides and RF waveguides that may be used in a physics package such as provided herein.

Any suitable number and type(s) of SWG waveguides and/or RF waveguides may be integrated into the present physics packages. For example, FIG. 9 schematically illustrates an alternative arrangement of SWG waveguides and RF waveguides that may be used in a physics package such as provided herein. The example shown in FIG. 9 includes a plurality of Devices 1, 2, and 3 each of which may include a SWG waveguide 230 which may be configured in a manner such as described with reference to FIG. 2A-2B, 4A-4B, 5A-5G, 6A-6B, or 7A-7B (the nonlimiting example shown in FIG. 8 including the SWG waveguide described with reference to FIGS. 6A-6B); and RF electrodes 361, 362 which may be configured in a manner such as described with reference to FIG. 3A-3B, 4A-4B, 5A-5G, 6A-6B, or 7A-7B. Devices 1, 2, and 3 optionally may receive different wavelengths of light than one another, may receive different RF frequencies than one another, and/or may be configured differently than one another, for example so as to measure different interactions between light and atomic or molecular vapor 250. In one purely illustrative example, Device 1 is used to measure an interaction between the atoms or molecules and light at wavelength $\lambda_1$ under perturbation from an RF field at a first frequency $\omega_1$, Device 2 is used to measure an interaction between the atoms or molecules and light at wavelength $\lambda_2$ under perturbation from an RF field at a second frequency $\omega_2$, and Device 3 is used to measure an interaction between the atoms or molecules and light at wavelength $\lambda_3$ under perturbation of an RF field at a third frequency $\omega_3$. In some examples, $\omega_1$, $\omega_2$, and/or $\omega_3$ are different than one another (e.g., are offset from one another by a fixed frequency, or are offset by a varying frequency), while in other examples $\lambda_1$, $\lambda_2$, and $\lambda_3$ are the same as one another. Additionally, or alternatively, in some examples, $\lambda_1$, $\lambda_2$, and $\lambda_3$ are different than one another (e.g., are offset from one another by a fixed wavelength spacing, or are offset by a varying wavelength spacing), while in other examples $\lambda_1$, $\lambda_2$, and $\lambda_3$ are the same as one another. In some examples, such as illustrated in FIG. 9, optical inputs from both sides may be used for Doppler free measurements. For example, Doppler shifts arise from an atom's or molecule's relative motion parallel to the laser beam. Two counter-propagating laser beams resonantly exciting an optical transition will only couple to atoms traveling perpendicular to the laser beam, in a process called saturated absorption spectroscopy or Doppler-free spectroscopy. In some examples, the overall footprint of a physics package including devices such as described with reference to FIG. 9 may be on the order of 1 cm×1 cm. Accordingly, it will be understood that the present physics packages may have a significantly reduced size, utility, and ease of use as compared to previously known vapor cells such as described with reference to FIGS. 1A-1B.

Figure 10:
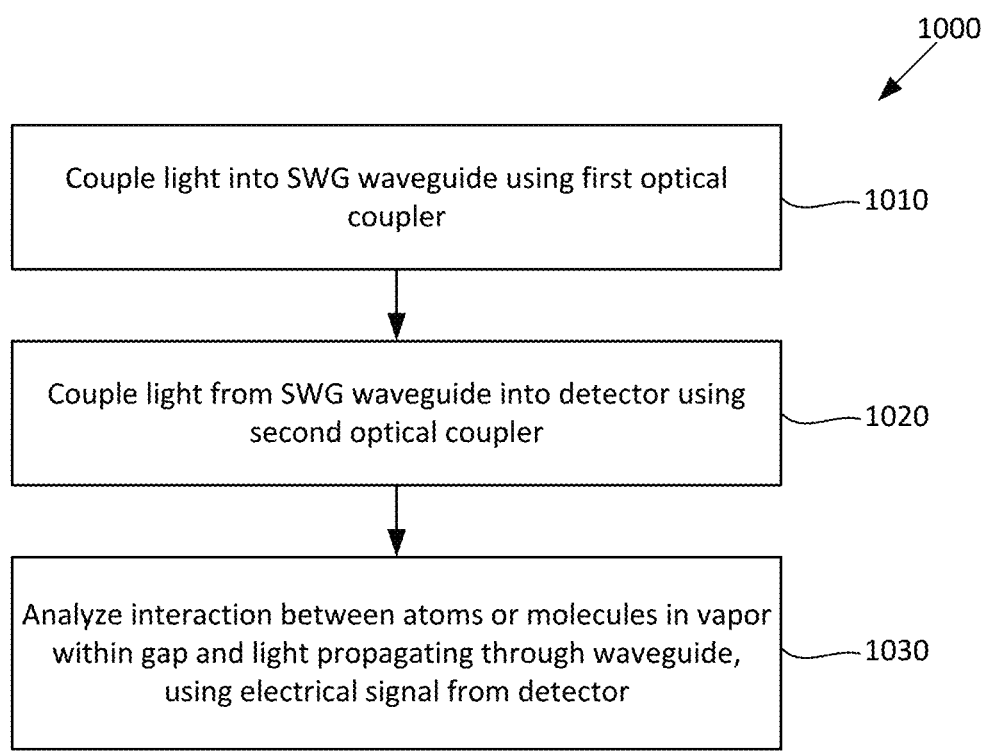
FIG. 10 illustrates a flow of operations in an example method for using a physics package such as provided herein.

Indeed, the present physics packages may be connected to, and used with, any suitable optical and/or electronic system. For example, FIG. 10 illustrates a flow of operations in an example method for using a physics package such as provided herein. Method 1000 illustrated in FIG. 10 includes coupling light into SWG waveguide 230 using the first optical coupler (operation 1010). Nonlimiting examples of SWG waveguide configurations are described further above. Method 1000 also includes coupling light from the SWG waveguide 230 into a detector using the second optical coupler (operation 1020). For example, propagating through the atoms or molecular vapor 250 within the gap(s) of SWG waveguide 230 may change a characteristic of the light. Method 1000 also includes analyzing the interaction between the atoms or molecules in the vapor within the gap and light propagating through the waveguide, using an electrical signal from the detector (operation 1030). For example, the electrical signal from the detector may have a characteristic which reflects the interaction between the atoms or molecules in the vapor within the gap and light propagating through the waveguide.

Illustratively, the present physics packages may be used in or as optical frequency references, atomic magnetic field sensors, atomic electric field sensors, atomic clocks, atomic inertial sensors, or other quantum technologies. Optical frequency reference applications in which the present physics packages may be used include, but are not limited to, optical communications, optical atomic clocks, atomic inertial sensors (such as for GPS-denied environments), or quantum memory for establishing a quantum communication network. Nonlinear optics applications in which the present physics packages may be used include, but are not limited to, optical signal processing or quantum light sources. Atomic magnetometer applications in which the present physics packages may be used include, but are not limited to, magnetic navigation, magnetic anomaly detection, communications, or medical imaging. Atomic electrometer applications in which the present physics packages may be used include, but are not limited to, GPS (Global Positioning System) receivers, signal intelligence, and communications. Atomic clock applications in which the present physics packages may be used include, but are not limited to, time reference.

While preferred embodiments of the invention are described herein, it will be apparent to one skilled in the art that various changes and modifications may be made. The appended claims are intended to cover all such changes and modifications that fall within the true spirit and scope of the invention.

What is claimed is:

1. A physics package for interacting with atoms or molecules in a vapor, the physics package comprising:
   a substrate;
   a cell sealed to the substrate and storing the vapor;
   a sub-wavelength grating (SWG) waveguide having a length and a width and disposed on the substrate,
   the SWG waveguide comprising a plurality of grating segments that are spaced apart from one another and define a gap within the SWG waveguide, the vapor being located at least within the gap;
   a first optical coupler configured to couple light into the SWG waveguide such that the light propagates through the vapor located within the gap and interacts with the atoms or molecules in the vapor located within the gap; and
   a second optical coupler configured to receive light from the SWG waveguide.

2. The physics package of claim 1, wherein the gap within which the vapor is located, and through which the light propagates, comprises a plurality of gaps which are located between the grating segments of the plurality of grating segments.

3. The physics package of claim 2, wherein the grating segments of the plurality of grating segments are interdigitated.

4. The physics package of claim 1, wherein:
   the plurality of grating segments comprise a first plurality of grating segments and a second plurality of grating segments that is spaced apart from the first plurality of grating segments by the gap within which the vapor is located, and through which the light propagates,
   the grating segments of the first plurality of grating segments are separated from one another by a first plurality of additional gaps, and
   the grating segments of the second plurality of grating segments are separated from one another by a second plurality of additional gaps.

5. The physics package of claim 1, wherein the cell comprises:
   a cover; and
   a spacer layer disposed on the substrate, the spacer layer coupling the cover to the substrate and sealing the vapor at least within the gap.

6. The physics package of claim 1, further comprising a radio frequency (RF) waveguide, comprising:
   a first RF electrode disposed on the substrate; and
   a second RF electrode disposed on the substrate,
   wherein the SWG waveguide is disposed between the first RF electrode and the second RF electrode.

7. The physics package of claim 6, further comprising:
   a first RF coupler configured to couple an RF signal into the first RF electrode and the second RF electrode; and
   a second RF coupler configured to receive the RF signal from the first RF electrode and the second RF electrode.

8. The physics package of claim 7, wherein the RF signal perturbs the interaction between the light and the atoms or molecules in the vapor within the gap.

9. The physics package of claim 1, wherein the atoms or molecules in the vapor have at least first and second Rydberg energy levels.

10. The physics package of claim 1, wherein the atoms comprise an alkali metal, or wherein the molecules comprise acetylene or HCN.

11. A method of making a physics package for interacting with atoms or molecules in a vapor, the method comprising:
    disposing a sub-wavelength grating (SWG) waveguide having a length and a width on a substrate,
    the SWG waveguide comprising a plurality of grating segments that are spaced apart from one another and define a gap within the SWG waveguide;
    coupling a first optical coupler to the SWG waveguide such that light input to the first optical coupler propagates through the gap;
    coupling a second optical coupler to the SWG waveguide to receive light from the SWG waveguide; and
    sealing the vapor at least within the gap.

12. The method of claim 11, wherein the gap within which the vapor is located, and through which the light propagates, comprises a plurality of gaps which are located between the grating segments of the plurality of grating segments.

13. The method of claim 12, wherein the grating segments of the plurality of grating segments are interdigitated.

14. The method of claim 11, wherein:
the plurality of grating segments comprise a first plurality of grating segments and a second plurality of grating segments that is spaced apart from the first plurality of grating segments by the gap within which the vapor is located, and through which the light propagates,
the grating segments of the first plurality of grating segments are separated from one another by a first plurality of additional gaps, and
the grating segments of the second plurality of grating segments are separated from one another by a second plurality of additional gaps.

15. The method of claim 11, wherein sealing the vapor at least within the gap comprises:
disposing a spacer layer on the substrate; and
coupling a cover to the spacer layer.

16. The method of claim 11, further comprising disposing a radio frequency (RF) waveguide on the substrate, comprising:
disposing a first RF electrode on the substrate; and
disposing a second RF electrode on the substrate,
wherein the SWG waveguide is disposed between the first RF electrode and the second RF electrode.

17. The method of claim 16, further comprising:
coupling a first RF coupler to the first RF electrode and the second RF electrode such that an RF signal applied to the first RF coupler propagates through the first RF electrode and the second RF electrode; and
coupling a second RF coupler to the first RF electrode and the second RF electrode so as to receive the RF signal that propagates through the first RF electrode and the second RF electrode.

18. The method of claim 11, wherein the atoms or molecules in the vapor have at least first and second Rydberg energy levels.

19. The method of claim 11, wherein the atoms comprise an alkali metal, or wherein the molecules comprise acetylene or HCN.

20. A method of using the physics package of claim 1, the method comprising:
coupling light into the SWG waveguide using the first optical coupler;
coupling light from the SWG waveguide into a detector using the second optical coupler; and
analyzing the interaction between the atoms or molecules in the vapor within the gap and light propagating through the SWG waveguide, using an electrical signal from the detector.

* * * * *